Dec. 30, 1969  R. W. ARNETT  3,486,283
SOFFIT MOLDING
Original Filed Dec. 6, 1966  2 Sheets-Sheet 1
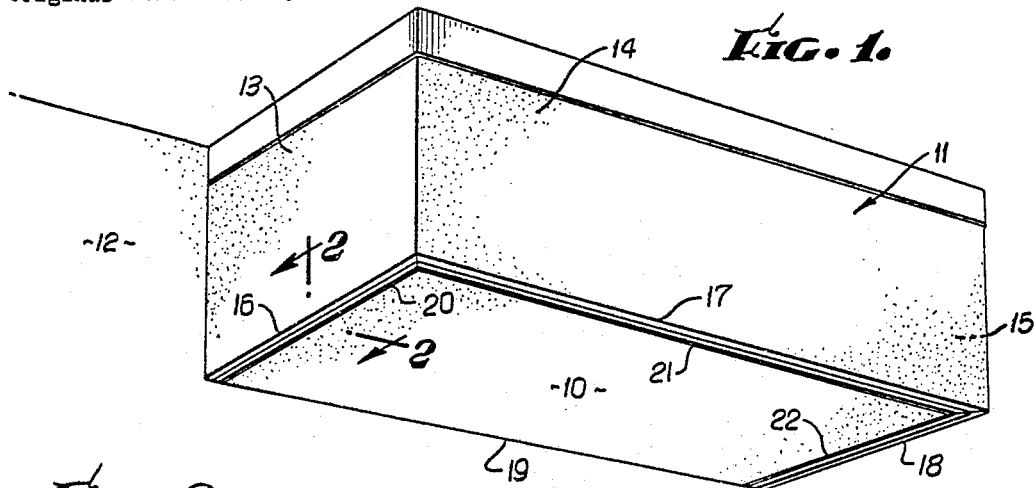
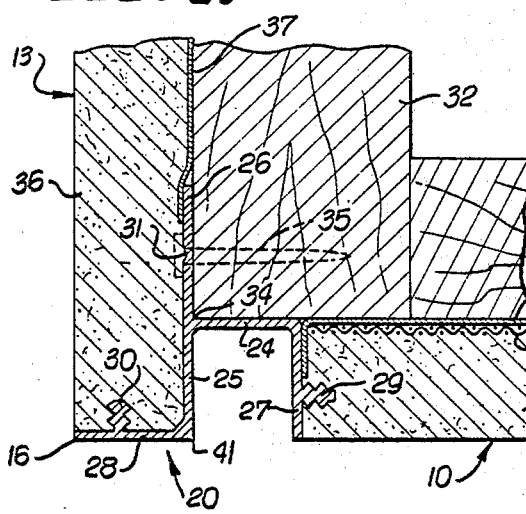
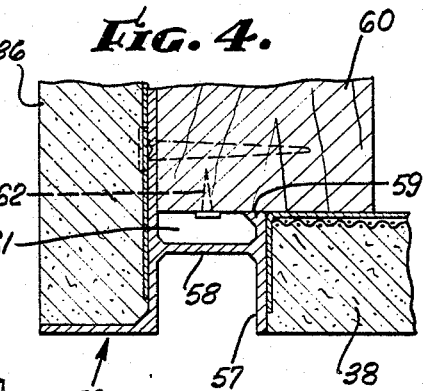
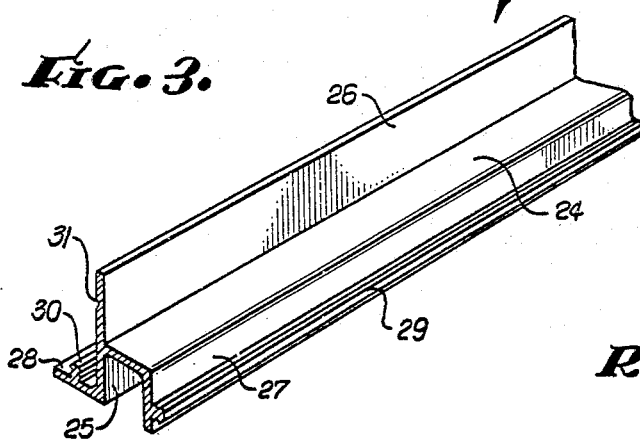
INVENTOR.
ROBERT W. ARNETT
BY Flam and Flam
ATTORNEYS.

Dec. 30, 1969     R. W. ARNETT     3,486,283
SOFFIT MOLDING
Original Filed Dec. 6, 1966     2 Sheets-Sheet 2
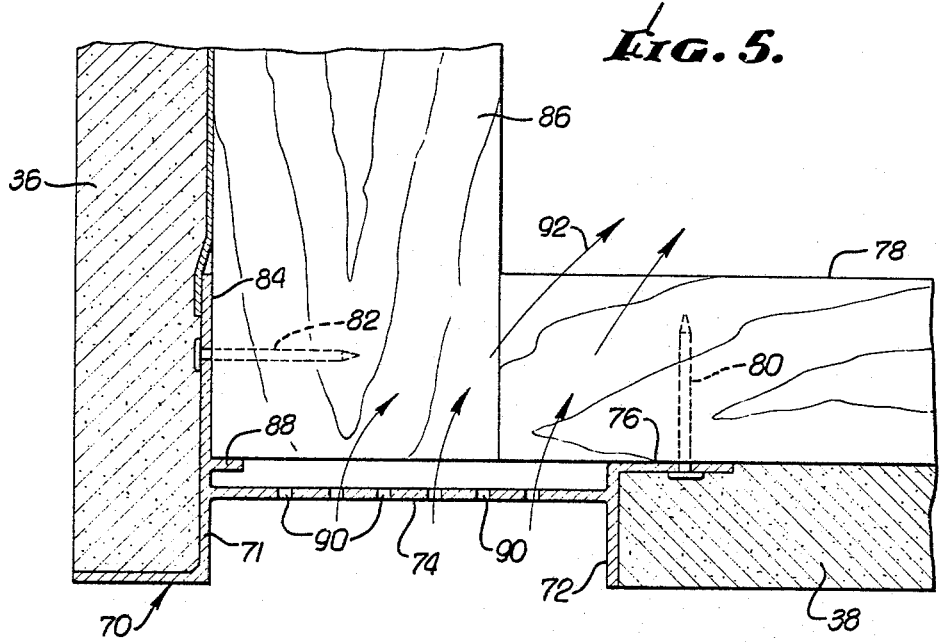
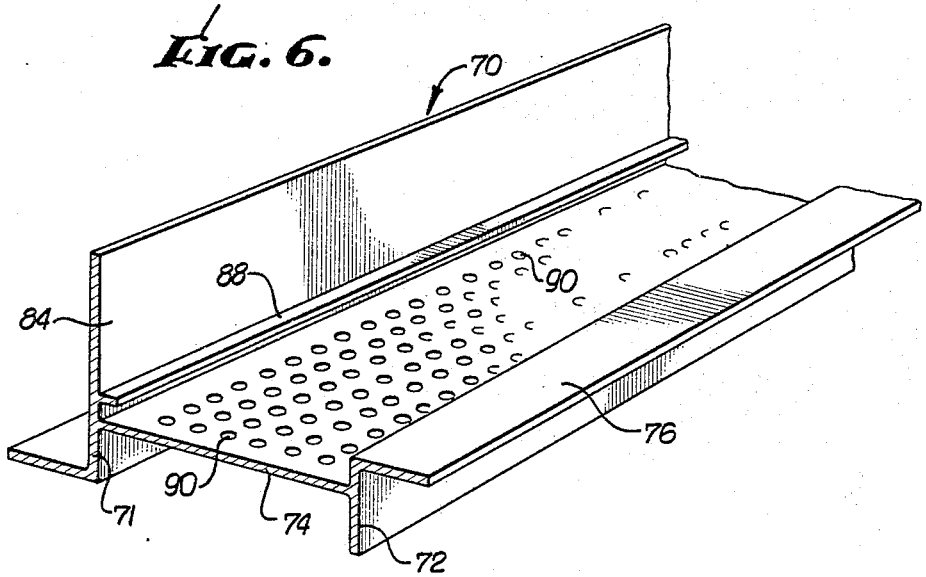
INVENTOR.
ROBERT W. ARNETT
By Flam and Flam
ATTORNEYS.

United States Patent Office 3,486,283
Patented Dec. 30, 1969

3,486,283
SOFFIT MOLDING
Robert W. Arnett, Pasadena, Calif. (% Fry Reglet Corporation, 3028 Dolores St., Los Angeles, Calif. 90065)
Continuation of application Ser. No. 599,562, Dec. 6, 1966, which is a continuation-in-part of application Ser. No. 443,582, Mar. 29, 1965, which in turn is a continuation-in-part of application Ser. No. 404,882, Oct. 19, 1964. This application Dec. 5, 1968, Ser. No. 781,496
Int. Cl. E04f *19/04;* E04b *1/70*
U.S. Cl. 52—255  8 Claims

ABSTRACT OF THE DISCLOSURE

A soffit molding is attached along an outside corner formed in part by an overhanging wall. The molding has an inverted channel to prevent water from running inwardly from the corner along the under surface of the wall, and it also provides a ledge to act as a ground for finish material such as plaster applied to the vertical wall.

RELATED APPLICATIONS

This is a continuation of application Ser. No. 599,562, filed Dec. 6, 1966, now abandoned which was a continuation-in-part of application Ser. No. 443,582, filed Mar. 29, 1965, now abandoned, which was a continuation-in-part of application Ser. No. 404,882, filed Oct. 19, 1964, now abandoned.

BRIEF SUMMARY OF THE INVENTION

This invention relates to construction materials, and particularly, to molding structures for exterior use.

There are many instances in which under sides of structures are exposed, as for example, overhanging balconies, stairways, cornices, and the like. Water tends to run inwardly along the soffit instead of dripping off the soffit edge. This is especially true when even slight wind exists. As a result, the soffit becomes stained and unsightly. It has been proposed to fasten an inverted channel along the corner of the soffit, and thus break the continuity of the flow path. In order to integrate such channels with the vertical wall adjoining the soffit, it has also been proposed to provide a ledge on such channel to form a plaster screed or ground. The difficulty with these known structures is that they too produce stains because the heads of nails fastening the webs of the channel are exposed in the channel. Moisture soon starts its inevitable decomposition process and staining results. Also, a good deal of care is required to ensure proper placement of such devices along the edge of the soffit. Furthermore, the nails do not adequately resist downward force since only the friction of the nails in their holes resists such force.

The primary object of this invention is to provide an improved sturdy drip molding for soffits free of the foregoing disadvantages. For this purpose, use is made of an extrusion having an attaching flange that provides a corner readily fitting the edge of the soffit frame. The flange is fastened to the soffit frame by horizontally extending nails. Plaster or other finish material overlies the flange and the nail head, and thus shields the nail head from the weather. Furthermore, the nails are placed in shear and thus effectively secure the molding even though the molding may bear some load. The flange also increases the blending moment of inertia of the molding, ensuring against unsightly deviation from a straight-line configuration as well as adding over-all strength.

In some instances, there may be imperfectly driven nails projecting from the soffit. Another object of this invention is to provide a drip molding designed precisely to corner at the soffit edge despite the existence of such nails or other objects. For this purpose, the extrusion is provided with a flange that defines a recess to provide suitable clearance whereby interference with nails or other objects at the soffit surface is avoided.

Another object of this invention is to provide a soffit molding of this character capable of providing ventilation openings for the space above, thus obviating the requirement of separate screened openings for such purpose.

This invention possesses many other advantages and has other objects which may be made more clearly apparent from a consideration of several embodiments of the invention. For this purpose, there are shown a few forms in the drawings accompanying and forming part of the present specification, and which drawings are to scale. These forms will now be described in detail, illustrating the general principles of the invention. Structural and operational characteristics attributed to forms of the invention first described shall also be attributed to forms later described, unless such characteristics are obviously inapplicable or unless specific exception is made. It is to be understood that the following detailed description is not to be taken in a limiting sense, since the scope of the invention is best defined by the appended claims.

BRIEF DESCRIPTION OF THE DRAWINGS

FIGURE 1 is a pictorial view of a soffit structure incorporating the present invention.

FIG. 2 is an enlarged fragmentary transverse sectional view taken along a plane corresponding to line 2—2 of FIG. 1.

FIG. 3 is a pictorial view of the molding structure forming a part of the apparatus depicted in FIGS. 1 and 2.

FIG. 4 is a sectional view similar to FIG. 2, but illustrating a modified form of the present invention.

FIG. 5 is a sectional view similar to FIG. 2 but illustrating another modified form of the present invention.

FIG. 6 is a pictorial view of the molding structure forming a part of the apparatus depicted in FIG. 5.

DETAILED DESCRIPTION

In FIG. 1 there is illustrated the soffit 10 formed in this instance as the undersurface of a balcony 11. The balcony 11 projects as a subordinate structure from a vertical wall 12 of a building. Vertical walls 13, 14 and 15 of the balcony 11 meet the soffit 10 at edges 16, 17 and 18. The fourth edge 19 of the soffit 10 merges with the building wall 12.

Water descending along the walls 13, 14 and 15 to the soffit edges 16, 17 and 18 tends to move inwardly along the soffit 10. To prevent such water flow, use is made of soffit moldings 20, 21 and 22. The moldings 20, 21 and 22 are all made from metal or plastic bar stock material 23 of uniform transverse cross-sectional configuration, as illustrated in FIG. 3. The material 23 may be made, by way of example, as an aluminum extrusion. The material 23 is in the form of a modified channel having a web 24. One side wall 25 of the channel extends at right angles to the web 24. One part of the side wall 25 extends on the opposite side of the web 24 and forms an attaching flange 26. The channel has a second side wall 27 that is in opposed spaced parallel relationship to the side wall 25. Projecting at right angles from the end of the side wall 25 and at a place remote from the web 24 and the upper or distal end of the flange 26, is a supporting ledge 28.

Projecting laterally from the second channel wall 27 is a serrated or fluted rib 29. A similar serrated rib 30 projects upwardly from the ledge 28. Extending along the outer side of the flange 26 is a V-shaped groove 31.

The balcony structure 11, which forms the soffit 10, has a frame including abutting elements 32 and 33 as depicted in FIG. 2. The frame element 32 in this instance defines a corner 34 along which the molding 20 is attached. Similar frame elements are provided for attachment of the moldings 21 and 22. The flange 26 defines with the web 24 of a corner that fits the frame corner 34. Thus, the web 24 is placed against the undersurface of the frame element 32 and the flange 26 is placed along the vertical surface of the frame element 32. The channel of the molding is inverted to open downwardly. Nails, as at 35, fasten the flange 26 to the frame element 32. The nails 35 extend horizontally and are guided for penetration of the flange 26 by the aid of the V-groove 31.

Finish material 36, in this instance in the form of exterior stucco, is applied to the frame element 32. The ledge 28 forms a plaster ground, an unobstructed corner being formed between the ledge 28 and the side walls 25 in which the plaster may be cast. The side wall 25, including the flange part 26, is located entirely beyond the corner for free access of the plaster 36. The rib 30 interlocks the plaster. Paper or other suitable material 37 is attached to the exterior surface of the frame 32 and preferably overlies the upper edge of the attaching flange 26.

Finish material also in the form of plaster 38 is applied to the undersurface of the soffit frame. Wire mesh 49 is applied to the soffit frame elements 32 and 33 together with paper 40. The end of the plaster material 38 abuts the exterior surface of the second side wall 27 of the channel structure and is interlocked by the rib 29.

Any moisture falling along the exterior surface of the plaster 36 may move inwardly from the end of the ledge 28 to a corner 41 of the channel structure. From there it must necessarily accumulate until it drips off the soffit. Such water is thus isolated and prevented from moving inwardly along the exposed surface of the finish material 38.

The nails 35 are protected by the plaster material 36 from any moisture and, accordingly, are preserved against decomposition. No nails or other fastening devices are necessary at the channel web 24. The nails 35 are placed in shear as to the vertical load imposed upon the frame element 23, and thus operate efficiently to sustain any load.

The moldings 21 and 22 are attached in an identical manner. The edges of the moldings 20, 21 and 22 are suitably mitred in order to achieve an appropriate fit at their adjoining ends. Since the moldings corner to the soffit frame, as at 34, alignment between the moldings and the frame is automatically ensured.

In the form of the invention illustrated in FIG. 4, a molding 56 quite similar to the molding 20 is shown. However, the channel wall 57 (corresponding to the channel wall 27 of the previous form) is extended upwardly beyond the web 58 to form a footed flange 59. The flange 59 contacts the soffit frame element 60 and offsets the web downwardly therefrom. Accordingly, a recess 61 is formed that freely receives bent-over ends of nails or the like and as indicated generally by the tack 62. Such nails or tacks are usually located adjacent the soffit corner and hence will not interfere with the contact of the flange 59 with the soffit necessary for a proper fitted relationship.

The central web 58 in the present instance lies closer to the lower edges of the molding 56 to compensate for the downward offset thereof by the flange 59. In the present form, the serrated ribs are deleted. In all other respects the molding 56 is the same as the molding of the previous form.

In the form ilustrated in FIG. 5, a molding 70 is provided that is quite similar to the molding 56 shown in the previous form. Thet channel walls 71 and 72, however, are widely separated by a web 74. The molding 70 in this instance thus requires attachment at two places. Adjoining the upper end of the channel wall 72 is a flange 76 extending outwardly at right angles and adapted to contact horizontal frame element 78 of a roof or other overhanging structure. Nails 80 pass through the flange 76 and into the horizontal frame element 78. Nails 82, passing through the upward extension 84 of the channel wall 71, engage the frame element 86 and thus cooperate with the nails 80 to secure the molding in place.

Extending inwardly from the extension wall 84 is a short ledge 88 spaced above the web 74. The wall 72 is correspondingly extended above the web 74. The flange 76 and ledge 88 thus together determine a downward offset of the web 74 to provide a recess in which the heads or nails or tacks may be received.

The web 74 provides a substantial area beneath the frame elements 78 and 86 of the overhanging roof structure. By providing perforations 90 in the web substantial ventilation is achieved from the frame elements which are normally on twelve- or eighteen-inch centers. The arrow 92 (FIG. 5) indicates the course of air. The channel configuration adequately prevents horizontal movement of water in the same manner as the moldings of the previous forms.

I claim:

1. A soffit molding of unitary construction of substantially uniform cross-sectional configuration, said molding having a web and side walls forming a channel, one of the side walls having a part extending beyond the channel on the opposite side of the web to form an attaching flange, there being a ledge projecting outwardly of the said channel side wall in spaced relationship to the distal end of said part; the corner above said ledge in the direction of said distal end of said attaching flange being free of obstructions to provide a space in which finish material may be placed with said finish material in abutting relationship to said ledge and said part.

2. A soffit molding of unitary construction of substantially uniform cross-sectional configuration, said molding having a web and side walls forming a channel, one of the side walls extending beyond the channel on the opposite side of the web to form an attaching flange, the other of the side walls extending beyond the channel on the opposite side of the web to a lesser extent than said attaching flange to form a soffit contacting flange, and with said web and attaching flange a recess in which nail heads and the like may be received, there being a ledge projecting outwardly of said one side wall of said channel to form a ground for finish material.

3. In a building construction: a soffit frame having a vertical surface and a horizontal under surface meeting at a soffit edge; a molding of unitary construction of substantially uniform cross-sectional configuration, said molding having a web and side walls forming an inverted channel, the web extending beneath said horizontal under surface adjacent said soffit edge, one of said side walls having a part extending upwardly beyond the channel web along the vertical surface of said soffit frame, said molding having a horizontal ledge projecting outwardly of said vertical surface; nails passing through said part and engaging said soffit frame; first finish material applied to said vertical surface and shielding said nails, said first finish material being grounded on said ledge; and second finish material applied to said horizontal surface and substantially abutting the other side wall of said inverted channel.

4. The combination as set forth in claim 3 in which the other side wall of the channel also extends upwardly beyond the channel web ad abuts said under surface.

5. The combination as set forth in claim 1 in which said web in provided with apertures distributed substantially uniformly over its area to provide ventilation.

6. The combination as set forth in claim 1 in which said web is provided with apertures distributed substantially uniformly over its area to provide ventilation.

7. The combination as set forth in claim 3 in which said web is provided with apertures distributed substantially uniformly over its area to provide ventilation.

8. The combination as set forth in claim 2 in which said web is horizontally extended and is provided with ventilation apertures located throughout the area thereof; the said one wall having a ledge projecting inwardly in juxtaposed relationship to said web to insure the downward offset of said web; there being a second attaching flange formed as an outward lateral extension at the end of said other side wall located beyond the channel web.

References Cited

UNITED STATES PATENTS

| | | | |
|---|---|---|---|
| 448,187 | 3/1891 | Kees | 52—256 |
| 1,673,971 | 6/1928 | Dowell | 52—255 X |
| 2,391,581 | 2/1945 | Markuson | 52—255 |
| 2,454,523 | 11/1948 | Philip | 52—255 X |
| 2,728,957 | 1/1956 | Keller | 52—288 |
| 3,007,213 | 11/1961 | Hobbs | 52—288 |
| 3,174,421 | 3/1965 | Gray | 52—91 X |

FRANK L. ABBOTT, Primary Examiner

P. C. FAW, Jr., Assistant Examiner

U.S. Cl. X.R.

52—278, 288, 716